(12) United States Patent
Takaya et al.

(10) Patent No.: US 8,782,697 B2
(45) Date of Patent: Jul. 15, 2014

(54) SYSTEM AND METHOD FOR PROVIDING IMPROVED CHANNEL MAPPING

(75) Inventors: Norifumi Takaya, San Diego, CA (US); Xuan Zhang, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 936 days.

(21) Appl. No.: 12/404,192

(22) Filed: Mar. 13, 2009

(65) Prior Publication Data

US 2010/0235859 A1  Sep. 16, 2010

(51) Int. Cl.
*H04N 5/445* (2011.01)
*H04N 21/482* (2011.01)
*H04N 21/431* (2011.01)

(52) U.S. Cl.
CPC .............. *H04N 5/445* (2013.01); *H04N 21/482* (2013.01); *H04N 21/431* (2013.01); *H04N 5/44543* (2013.01)
USPC ......................................................... 725/38

(58) Field of Classification Search
CPC ... H04N 5/445; H04N 21/431; H04N 21/482; H04N 21/84; H04N 5/44543
See application file for complete search history.

(56) References Cited

U.S. PATENT DOCUMENTS

| | | | | |
|---|---|---|---|---|
| 4,070,629 | A | * | 1/1978 | Merrell ...................... 455/182.2 |
| 6,621,528 | B1 | | 9/2003 | Kessler et al. |
| 7,024,676 | B1 | * | 4/2006 | Klopfenstein .................. 725/49 |
| 2005/0229208 | A1 | | 10/2005 | Tsubouchi |
| 2008/0134233 | A1 | * | 6/2008 | Kinoshita ....................... 725/28 |
| 2008/0284917 | A1 | | 11/2008 | Inui |

* cited by examiner

*Primary Examiner* — Nathan Flynn
*Assistant Examiner* — James R Marandi
(74) *Attorney, Agent, or Firm* — Fitch, Even, Tabin & Flannery LLP

(57) ABSTRACT

Improved channel mapping is provided wherein both virtual channel information associated with the currently-tuned channel, as well as physical channel information associated with this same channel is added to a television system's channel map. User inconvenience associated with errors in the virtual channel information may be mitigated since the television system's channel map will contain, not only the standard virtual channel information provided by broadcast stations in their broadcast signals, but also the corresponding physical channel information for the broadcast station in question. In other embodiments, multiple channel maps may be maintained and be user-selectable.

24 Claims, 3 Drawing Sheets

SYSTEM AND METHOD FOR PROVIDING IMPROVED CHANNEL MAPPING

FIELD OF THE INVENTION

The present invention relates in general to digital television channel tuning, and in particular to providing improved channel mapping in which both virtual and physical channel line-ups are available to the user.

BACKGROUND

Modern digital television systems recognize the use of so-called virtual channels, which are channel designations that are different than the actual radio frequency on which the broadcast provider's signal travels. Specifically, the virtual channel is the channel number the broadcast station chooses to display on the user's television system, while the physical channel is a number corresponding to a specific frequency range. For example, a broadcast station that has branded itself as "Channel 20" may actually broadcast on channel 45 (i.e., within the band of frequencies associated with channel 45). In this case, channel 45 would be the physical channel while channel 20 would be the virtual channel. Compounding the issue is that broadcast stations even use different physical channels for different geographic areas. The use of virtual channel thus enables viewers to receive the broadcast station's signal by choosing the branded channel number regardless of their particular geographic areas, and regardless of the physical channel on which the station has decided to broadcast.

To properly make use of virtual channels, most modern television systems have the ability to perform an auto-program to search received signals in order to populate a channel map. This procedure is typically done when a television is first placed in service. This channel map enables the television system to limit the channels that are displayed or otherwise accessible to the user to only those channels that actually contain broadcast content.

For digital television in the United States and other regions, digital television channels are describe via meta data contained in Program and System Information Protocol (PSIP) tables that are associated with the transport stream of the channel. PSIP data is based on the known protocol used in the ATSC digital television standard for carrying metadata for broadcast programming, and is normally relied on to help to find and tune digital programming. Specifically, the PSIP data defines virtual channels and content ratings, as well as electronic program guides with titles and descriptions that can be decoded and displayed by the television system. Thus, when PSIP data is available, this data is used during the auto-programming procedure to populate the channel map with the available virtual channel information.

However, as digital television becomes more widespread, many more field issues related to the PSIP data are being encountered. In many cases, the cause of the problem are errors made by the broadcast content providers (e.g., cable providers, terrestrial signal providers, etc.) themselves in transmission of the PSIP data. These field issues often result in service calls being placed to broadcast content providers' and/or television manufacturers' customer service centers. When these problems are due to faulty information in the PSIP data of a television channel, this typically also means that the customer is unable to view that channel despite the fact that correct and valid video and audio data is otherwise available on some other unknown channel. This can result in unnecessary user frustration and excess service costs. As a result, there is a need in the art for a system and method in which the negative effects associated with broadcast content providers' errors in PSIP data can be minimized.

BRIEF SUMMARY OF THE INVENTION

Disclosed and claimed herein are systems and methods for providing improved channel mapping for a television system. In one embodiment, a method includes receiving a request to perform an auto-programming operation for the television system, tuning to a first channel within a predetermined frequency range, and determining if a broadcast signal associated with the first channel contains virtual channel information. The method also includes storing, in response to determining that the broadcast signal does includes virtual channel information, the virtual channel information associated with the first channel in a channel map of the television system. Additionally, the method includes storing, in addition to the virtual channel information, physical channel information associated with the first channel in the channel map.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF EXEMPLARY EMBODIMENTS

Disclosure Overview

Figure 1:
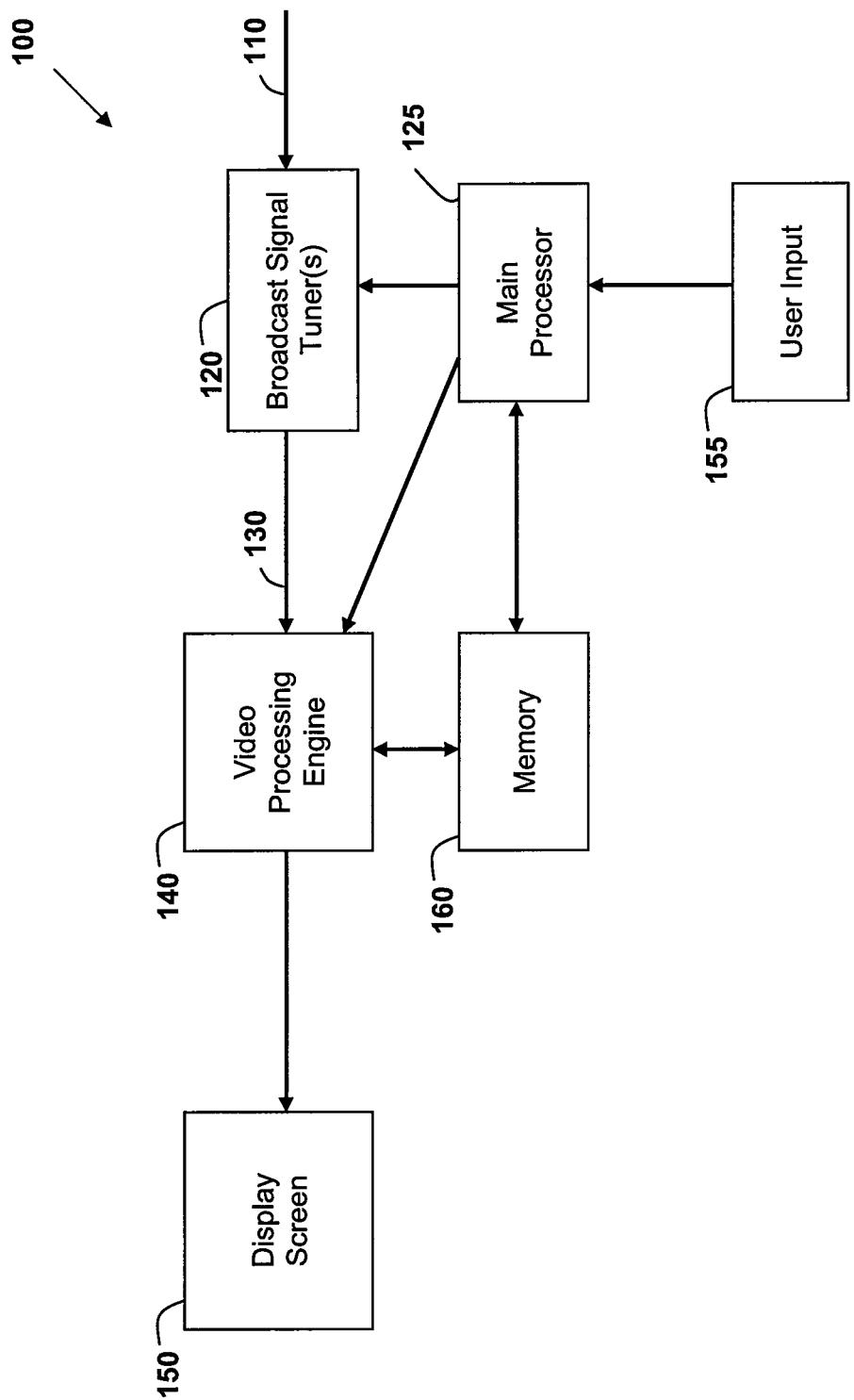
FIG. 1 depicts a television system configured to implement one or more embodiments of the invention.

One aspect of the present disclosure is to provide improved channel mapping. In one embodiment, an auto-programming operating begins with a television system tuning to a channel and detecting if there is any virtual channel information associated with the currently-tuned channel. If there is virtual channel information available, then this information may be added to the television system's channel map. Rather than moving on to the next channel in the auto-programming operation, another aspect of the present disclosure relates to also adding any physical channel information associated with the currently-tuned channel to the channel map. This process may repeat until all potential channels have been scanned.

In this fashion, any issues resulting from errors in the virtual channel information may be avoided since the television system's channel map will contain, not only the standard virtual channel information provided by broadcast stations in their broadcast signals, but also the corresponding physical channel information for the broadcast station in question. Thus, even if incorrect virtual channel information has been provided, the auto-programming process disclosed herein will enable the user to readily access the broadcast station in question since both the broadcast stations' virtual channels as well as the physical channels will have been added to the television system's channel map.

Another aspect of the disclosure relates to maintaining channel maps corresponding to all received channels, only received virtual channels, only received physical channels, or some combination thereof. In addition, a user may be provided with a means for changing the types of channels which are included in the television systems channel lineup (e.g., electronic program guide), and/or enabling the user to select which channel map from among a plurality of channel maps should be used by the television system's electronic program guide.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means any of the following: A; B; C; A and B; A and C; B and C; A, B and C. An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits When implemented in software, the elements of the invention are essentially the code segments to perform the necessary tasks. The code segments can be stored in a "processor storage medium," which includes any medium that can store information. Examples of the processor readable medium include an electronic circuit, a semiconductor memory device, a ROM, a flash memory or other non-volatile memory, a floppy diskette, a CD-ROM, an optical disk, a hard disk, etc.

Exemplary Embodiments

FIG. 1 is a block diagram of a television system 100 capable of implementing one or more aspects of the invention, including providing improved channel mapping. In one embodiment, television system 100 is a television system. As shown, television system 100 receives a broadcast video data signal 110, which may be in any number of video formats (e.g., National Television Standards Committee (NTSC), PAL, Digital Satellite System (DSS), Digital Broadcast System (DBS), Advanced Television Standards Committee (ATSC), etc.). The broadcast video data signal 110 may then be forwarded to one or more broadcast signal tuner(s) 120, which may be generally capable of receiving, decoding and tuning in both analog and digital signals under the direction of a main processor 125. As is generally known, television system 100 may include any number of tuners for any number of modulation schemes. Moreover, the incoming video data signal 110 may be separated into different sub-signals and provided to a corresponding one of the broadcast signal tuner(s) 120 based on their respective modulation schemes.

Tuned signal(s) 130 may then be forwarded to a video processing engine 140 for processing prior to being forwarded to a display 150 under the control of the main processor 125. As is generally known, the system 100 may further include one or more demodulators (not shown) that also demodulate the incoming video data signal 110.

Once the incoming video data signal 110 has been processed by the video processing engine 140, it may be rendered on or by the display 150, again as known in the art. It should be appreciated that the display screen 150 may correspond to any known type of display, including but not limited to cathode-ray tube, rear projection, liquid crystal display, plasma, etc.

The main processor 125 is responsive to a user input circuitry 155 to control the tuner(s) 120, video processing engine 140 and other related circuitry known in the art to be included in such television systems 100. By way of a non-limiting example, user input circuitry 155 may correspond to an infrared or radio frequency receiver for receiving user instructions from a remote control device.

During an auto-program procedure, which may be performed when the television system 100 is first placed in use for example, the video processing engine 140 analyzes the tuned signal(s) to detect which of the received channels, whether virtual or physical, actually carry broadcast content. That is, after the tuner(s) 120 tunes to a particular channel within the range of frequencies to be scanned, the video processing engine 140 may then determine if there is any broadcast content associated with the current channel. The identified channels may then be forwarded to memory 160 and stored in the form of a channel map. This channel map is then used to correlate the user's numerical channel entry with a particular broadcast station, and to provide station-specific information, such as a channel name or its call letters (e.g., CNN™, ESPN™, etc.). As will be described in more detail below with reference to FIG. 2, one aspect of the present disclosure relates to improving the auto-programming process by minimizing the effect that errors in this PSIP data may cause.

It should be appreciated that television system 100 may include additional circuitry known in the art but not shown in FIG. 1, such as demuxing circuitry, audio/video decoding circuitry, etc.

Figure 2:
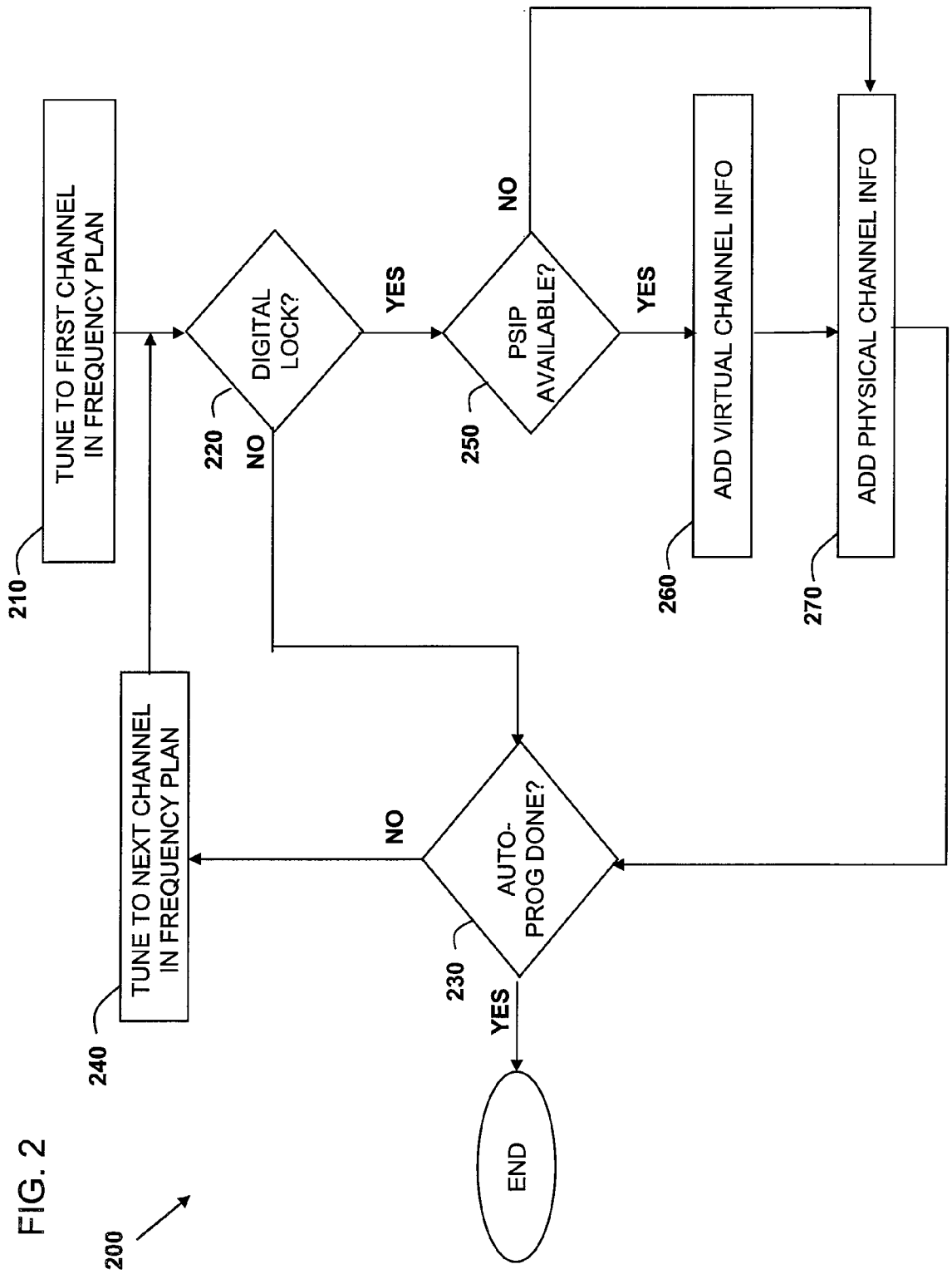
FIG. 2 depicts a flow diagram for implementing one or more embodiments of the invention.

Referring now to FIG. 2, depicted is one embodiment of a process 200 for performing an auto-programming operation in accordance with the principles of the invention. While this auto-programming operation may occur when a television system is first placed into use, it may similarly be performed in response to a user request.

In one embodiment, process 200 may be carried out by a one or more processors (e.g., video processing engine 140 and/or main processor 125) in a television system, such as television system 100. Process 200 begins at block 210 where the auto-programming operating may commence with the television system tuning (e.g., using tuner(s) 120) to a first channel in the auto-programming frequency plan. Process 200 may then continue to block 220 where a determination may be made as to whether a lock can be established onto an actual broadcast signal. If not, it is assumed that there is no usable broadcast content associated with the currently-tuned channel and process 220 may continue to block 230 where a determination may be made as to whether the auto-programming operation of process 200 is complete. If not, process 200 will continue to block 240 where the television system may then tune to the next channel along the frequency plan and again determine if a lock onto an actual broadcast signal is now possible. This process may repeat until all potential channels have been scanned.

However, when it is determined at block 220 that a lock has been made onto an actual broadcast signal, then process 200 would continue to block 250 where a determination is made as to whether there is any virtual channel information (e.g., PSIP data) associated with the currently-tuned channel. If there is no available PSIP data, process 200 will move to block 270 where the currently-tuned channel and any associated physical channel information (e.g., station call letters) may be added to the channel map as one or more physical channels. Such physical channel information may originate from the MPEG-2 transport stream itself. Specifically, the MPEG-2 transport stream will contain Program Specific Information (PSI), which includes several tables such as the Program Association Table (PAT) listing all programs available in the transport stream, and Program Map Tables (PMTs) that also contain information about programs. Thus, while PSIP data tends to provide much more detailed information, in certain embodiments the MPEG-2 PSI may be used to populate the channel map with the physical channel information associated with the currently-tuned channel.

If, however, it was determined at block 250 that the currently-tuned channel does have PSIP data, then process 200 may continue to block 260 where any virtual channel information (e.g., virtual channel numbers, station call letters, etc.) within the PSIP data may be saved (e.g., in memory 160) and correspondingly added to the system's channel map. Once this virtual channel information has been added to the channel map for the currently-tuned channel, and rather than simply moving to the next channel in the auto-programming operation, another aspect of the process 200 is to then also add any physical channel information associated with the currently-tuned channel to the channel map (block 270). As described above, such information may originate from the MPEG-2 transport stream itself, and particularly from the embedded MPEG-2 PSI data. Alternatively, the physical channel information from block 270 may be added to a different channel map than the channel map to which the virtual channel information from block 260 was added. That is, multiple separate channel maps may be stored with a first channel map corresponding to the PSIP-identified virtual channels, and a second channel map corresponding to the MPEG-2 PSI-identified physical channels. And since the frequency on which a physical channel is carried can contain multiple broadcast streams, it should further be appreciated that multiple virtual channels and/or multiple physical channels can be added to the one or more channel maps for any given currently-tuned channel.

Thereafter, process 200 may continue to block 230 where a determination may be made as to whether the auto-programming operation of process 200 is complete. If not, process 200 will continue to block 240 where the television system may then tune to the next channel along the frequency plan and again determine if a lock onto an actual broadcast signal is now possible. This process may repeat until all potential channels have been scanned.

In this fashion, any inconvenience resulting from errors in the PSIP data may be substantially overcome by the fact that the television system's channel map will contain, not only the standard virtual channel information provided by broadcast stations via PSIP data, but also the corresponding physical channel information for the broadcast station in question. Thus, even if incorrect virtual channel information has been provided in PSIP data, the auto-programming process 200 will enable the user to readily access the broadcast station in question since both the broadcast stations' virtual channels (i.e., identified from PSIP data) as well as the physical channels (e.g., using MPEG-2 PSI data) will have been added to the television system's channel map (or to at least one of a plurality of channel maps in the case of a multiple-channel-map embodiment).

Figure 3:
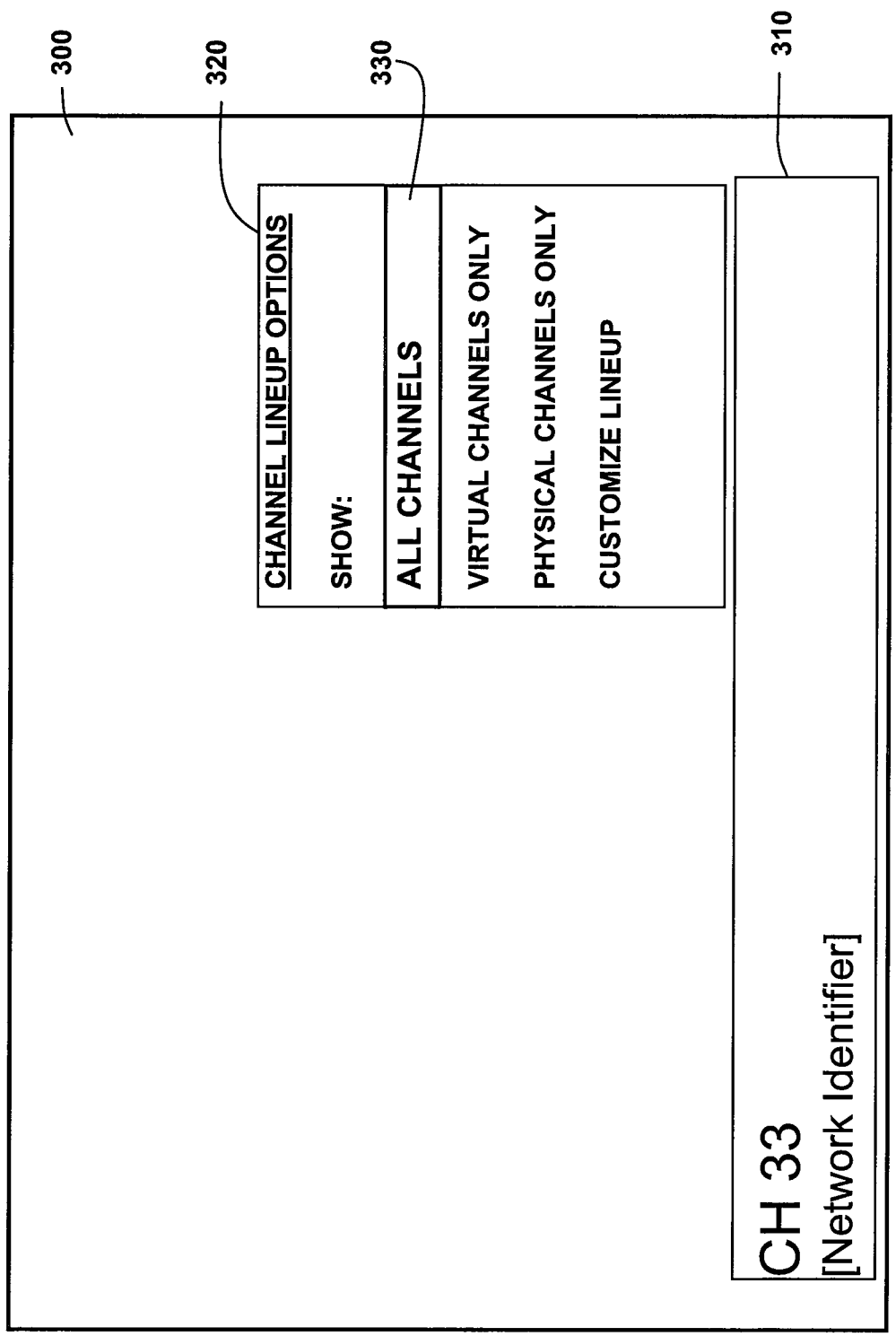
FIG. 3 depicts one embodiment of a display screen and user interface for providing channel lineup options.

Another aspect of the invention relates to providing users with different channel mapping options. To that end, FIG. 3 depicts a display screen 300 of a television (e.g., television system 100) after a user has tuned to a selected channel (i.e., channel 33) for which there is no corresponding broadcast station. FIG. 3 assumes that the auto-programming operation has been previously completed (e.g., during system setup), that a channel map has been generated and stored locally (e.g., in memory 160), and that an error in the PSIP data caused channel 33 to be erroneously identified as a virtual or physical channel for a broadcast station of interest.

Upon tuning to channel 33, a graphical banner 310 may be displayed for some predetermined period of time on the television screen 300, and may contain program information derived from the PSIP data (e.g., channel number, broadcast station call letters, etc.). However, since channel 33 is not a valid virtual or physical channel and no broadcast content is being received, the display screen 300 will be blank.

In this situation, a user would typically be unable to locate the true channel corresponding to the desired broadcast content. Thus, another aspect of the invention is to provide a means for changing the types of channels which are included in the television systems channel lineup (e.g., electronic program guide), and/or enabling the user to select which channel map from among a plurality of channel maps should be used by the television system's electronic program guide. In the particular embodiment of FIG. 3, this functionality is provided by way of the channel lineup options menu 320. From this menu, users can select all channels, virtual channels only, physical channels, or a customized lineup. The currently-highlighted selection 330 corresponds to selecting a channel lineup that includes all available channels (i.e., both virtual and physical). In this fashion, the user will be able to locate the physical channel or true virtual channel associated with the broadcast station of interest.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners.

What is claimed is:

1. A method for providing improved channel mapping for a television system comprising the acts of:

receiving a request to perform an auto-programming operation for the television system;

tuning to a first channel within a predetermined frequency range in response to said request;

determining if a broadcast signal associated with the first channel contains virtual channel information;

storing, in response to determining that the broadcast signal does includes virtual channel information, the virtual channel information associated with the first channel in a channel map of the television system;

storing, in addition to said virtual channel information, physical channel information associated with the first channel in the channel map; and providing selectable channel lineup options via a graphical user interface, wherein the selectable channel lineup options include a selectable option for displaying both a virtual channel associated with the first channel and a physical channel that is also associated with the first channel.

2. The method of claim 1, further comprising, prior to determining if the broadcast signal includes virtual channel information, establishing a digital lock onto a broadcast signal associated with the first channel.

3. The method of claim 1, further comprising storing both virtual channel information and physical channel information for each of a plurality of channels within the predetermined frequency range.

4. The method of claim 1, wherein storing said virtual channel information comprises storing one or more virtual channels associated with the first channel in the channel map.

5. The method of claim 1, wherein said virtual channel information comprises Program and System Information Protocol (PSIP) data.

6. The method of claim 1, wherein said physical channel information comprises Program Specific Information within a MPEG-2 transport stream of the broadcast signal.

7. The method of claim 1, wherein said virtual channel information and said physical channel information are stored in different channel maps of the television system.

8. The method of claim 1, wherein said selectable channel lineup options are provided to a user of the television system via said graphical user interface, and wherein the selectable option for displaying both a virtual channel associated with the first channel and a physical channel associated with the first channel includes displaying both the virtual channel and the physical channel in a program guide.

9. A television system for providing improved channel mapping comprising:
a display screen;
a broadcast signal tuner configured to receive broadcast programming;
a user input;
a memory; and
a processor electrically coupled to the display screen, broadcast signal tuner, user input and the memory, the processor configured to:
receive a request via the user input to perform an auto-programming operation for the television system,
tune the broadcast signal tuner to a first channel within a predetermined frequency range in response to said request,
determine if a broadcast signal associated with the first channel contains virtual channel information,
store, in response to determining that the broadcast signal does includes virtual channel information, the virtual channel information associated with the first channel in a channel map of the television system, wherein the channel map is stored in said memory;
store, in addition to said virtual channel information, physical channel information associated with the first channel in the channel map; and
provide selectable channel lineup options to the display screen via a graphical user interface, wherein the selectable channel lineup options include a selectable option for displaying both a virtual channel associated with the first channel and a physical channel that is also associated with the first channel.

10. The television system of claim 9, wherein the processor is further configured to establish, prior to determining if the broadcast signal includes virtual channel information, a digital lock onto a broadcast signal associated with the first channel.

11. The television system of claim 9, wherein the processor is further configured to store both virtual channel information and physical channel information in the channel map for each of a plurality of channels within the predetermined frequency range.

12. The television system of claim 9, wherein said virtual channel information comprises one or more virtual channels associated with the first channel.

13. The television system of claim 9, wherein said virtual channel information comprises Program and System Information Protocol (PSIP) data.

14. The television system of claim 9, wherein said physical channel information comprises Program Specific Information within a MPEG-2 transport stream of the broadcast signal.

15. The television system of claim 9, wherein said virtual channel information and said physical channel information are stored in different channel maps within the memory of the television system.

16. The television system of claim 9, wherein the selectable channel lineup options are provided to a user of the television system via the graphical user interface on the display screen, and wherein the selectable option for displaying both the virtual channel associated with the first channel and the physical channel associated with the first channel includes displaying both the virtual channel and the physical channel in a program guide.

17. A computer program product comprising:
a non-transitory storage medium having computer executable program code embodied therein to provide improved channel mapping for a television system, the non-transitory storage medium having:
computer executable program code to receive a request to perform an auto-programming operation for the television system;
computer executable program code to tune to a first channel within a predetermined frequency range in response to said request;
computer executable program code to determine if a broadcast signal associated with the first channel contains virtual channel information;
computer executable program code to store, in response to determining that the broadcast signal does includes virtual channel information, the virtual channel information associated with the first channel in a channel map of the television system;
computer executable program code to store, in addition to said virtual channel information, physical channel information associated with the first channel in the channel map; and
computer executable program code to provide selectable channel lineup options via a graphical user interface, wherein the selectable channel lineup options include a selectable option for displaying both a virtual channel associated with the first channel and a physical channel that is also associated with the first channel.

18. The computer program product of claim 17, wherein the non-transitory storage medium further comprises computer executable program code to establish, prior to determining if the broadcast signal includes virtual channel information, a digital lock onto a broadcast signal associated with the first channel.

19. The computer program product of claim 17, wherein the non-transitory storage medium further comprises computer executable program code to store both virtual channel information and physical channel information for each of a plurality of channels within the predetermined frequency range.

20. The computer program product of claim 17, wherein the computer executable program code to store said virtual channel information comprises computer executable program code to store one or more virtual channels associated with the first channel in the channel map.

21. The computer program product of claim 17, wherein said virtual channel information comprises Program and System Information Protocol (PSIP) data.

22. The computer program product of claim 17, wherein said physical channel information comprises Program Specific Information within a MPEG-2 transport stream of the broadcast signal.

23. The computer program product of claim 17, wherein said virtual channel information and said physical channel information are stored in different channel maps of the television system.

24. The computer program product of claim 17, wherein the non-transitory storage medium further comprises computer executable program code to display both the virtual channel associated with the first channel and the physical channel associated with the first channel in a program guide.

* * * * *